April 30, 1929.   J. B. KINTZING   1,711,204
POSITIVE SHUTTLE MOTION
Filed May 21, 1925
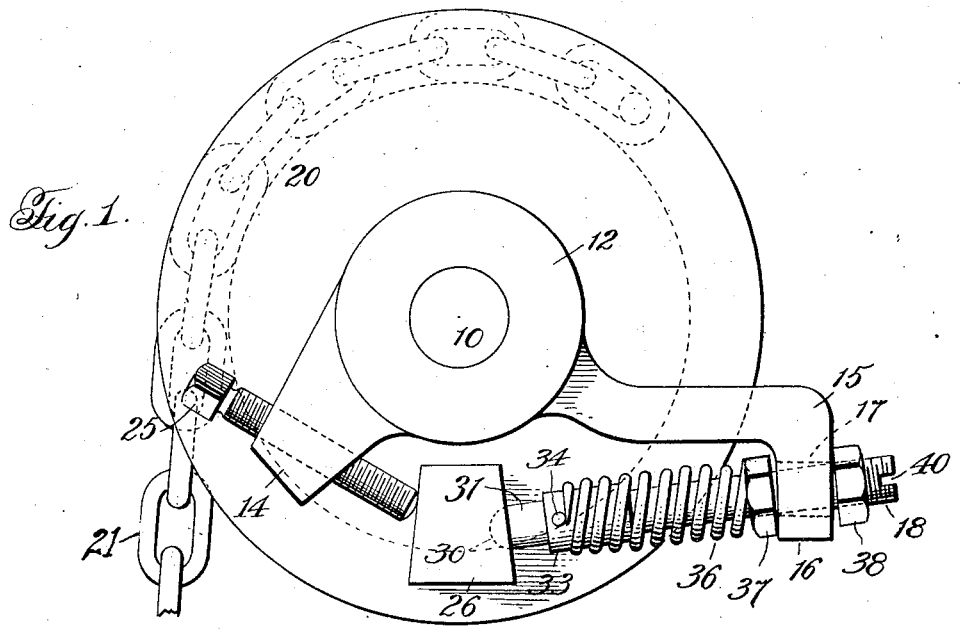
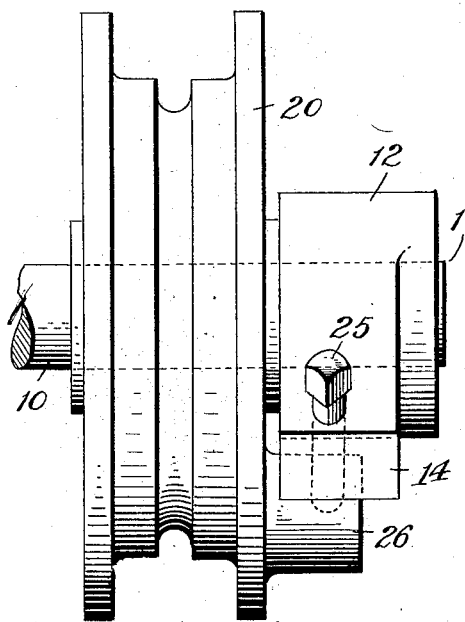
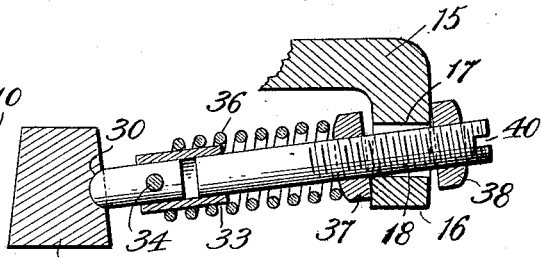
Inventor:
James B. Kintzing,
By Henry H. Snelling,
Attorney.
Witness:
Jas. Es. Hutchinson Patented Apr. 30, 1929.

1,711,204

UNITED STATES PATENT OFFICE.

JAMES B. KINTZING, OF HANOVER, PENNSYLVANIA.

POSITIVE SHUTTLE MOTION.

Application filed May 21, 1925. Serial No. 31,919.

This invention relates to a take-up device for taking up slack in driving mechanisms in which there is or may be lost motion.

The principal object of the present invention is the provision of a thoroughly efficient device of this type and one that will be applicable to the split drive shaft of the shuttle bar mechanism of a wire cloth loom.

In wire cloth looms, for example, as shown in Kintzing Patent #785,958, March 28, 1905, there is generally a central sheave wheel or disk which carries arms at the extreme ends of which are pivoted long rods secured at their free ends to the shuttle bars. This wheel or disk is usually chain driven and the chain is fast at each end to a pulley on one of the twin drive shafts and the mechanism of the present invention is applied to the free or outer end of each of those twin drive shafts.

In the drawings:

Figure 1 is a side elevation of the device;

Figure 2 is an edge view; and

Figure 3 is a central longitudinal section through the drive pin.

The numeral 10 in the drawings is applied to one of the twin upper drive shafts of a wire loom to the outer end of which shaft is keyed or otherwise secured a hub 12 carrying a short tapped lug 14 and a preferably integral bracket 15, the right angular end 16 of which has an elongated slot 17 therein to accommodate the larger portion 18 of the drive pin.

The chain sheave 20 is loose on the shaft 10 and the driving chain 21 is fast to this sheave 20. By way of explanation, the chain 21 joins a hooked rod carried at the end of a crank on the main drive shaft so that the lower end of chain 21 is pulled downwardly at regularly recurring intervals, thus driving the shaft 10, which shaft is moved in the opposite direction by virtue of its connections with the other twin shaft, that is one exactly similar to 10.

The lug 14 receives a set screw 25, which limits in one direction relative movement of the sheave 20 and the hub 12, the sheave carrying a projection 26 preferably of the keystone shape shown, that is with its sides substantially normal to the line of drive of the driving pin.

Referring now particularly to Figure 3, the projection 26 has a spherical indentation 30 therein, into which fits the smaller section 31 of the driving pin, this section being preferably of the same diameter as the major portion 18 and carrying in any suitable preferably semi-permanent manner a sleeve 33, into which telescopes the major portion 18. While the sleeve 33 may be permanently secured to the portion 31, I prefer to secure this connection by means of a pin 34, which may be driven out, if necessary, to separate the parts.

A spring 36 is confined between the extending ends of the pin 34 and a nut 37 on the driving pin. This nut 37 serves with the corresponding nut 38 to position the driving pin and to regulate the amount of lost motion between the two sections 18 and 31. For convenience in altering the clearance or lost motion, I preferably kerf the threaded end of the major portion 18 of the driving pin as shown at 40.

The operation of the device is as follows: The crank arm on the main driving shaft located a considerable distance below the twin shafts 10 moves downwardly, pulling on the chain 21, which, as will be remembered, is fast to the sheave 20, while the latter is loose on the shaft 10. This causes the projection 26, which is in engagement with the short section 31 to move this section 31 and its sleeve 33 until engagement is had between the two sections of the driving pin, at which time the chain will drive the shaft 10 through the drive pin, the bracket 15, and the hub 12 fixed on the shaft 10, and during this period, the spring 36 will be compressed, but otherwise having no function, the drive being direct.

At the completion of this oscillation of the shaft 10, the other twin shaft will begin to operate, tending to turn the shaft 10 in the opposite direction, which would cause a snap, due to the lost motion caused by wear of the parts, in the absence of the separation of the drive pin and the provision of the spring 36. With these means present, however, at the moment tension on the chain 21 ceases, the spring 36 acts, and it presses the projection 26 firmly against the set screw 25, so that when the opposite chain operates, the screw 25 will already be in contact with and ready to drive the projection 26 and through it the sheave 20, allowing the chain 21 to return to its former position without formation of slack.

What I claim is:

1. In a device wherein power is transmitted alternately from a wheel to a shaft and from the shaft to the wheel, a shaft to be oscillated, a spider and a wheel each mounted on the shaft, one of these members being fixed with respect to the shaft and the other loose with respect thereto, an integral lug extending from the wheel adjacent the arms of the spider and resilient means holding the lug in chosen angular relation to the spider at the end of each stroke.

2. In a positive shuttle motion for wire looms of the type in which twin shafts are employed which shafts are reversely driven during the weaving operation; a shaft to be reversely driven, two members on said shaft, one loose on the shaft and the other fixed to the shaft, said members being yieldingly held in relative position by means of two stops, one of said stops consisting in a pair of alined rods, a sleeve fixedly secured to one of the rods and slidably receiving the other rod, adjusting means on one of the rods, and a spring engaging said sleeve to hold the rods separated.

3. In a positive shuttle motion for wire looms of the type employing twin reversely driven shafts; a shaft, a wheel loose on the shaft, a spider fixed to the shaft having a radially extending return arm and an angular power arm, a trapezoidal lug fixedly secured to the wheel, adjustable rigid means limiting the approach of the lug to the return arm, and a member loosely extending thru the power arm and spring pressed into contact with the lug to hold the lug against the rigid adjustable means whereby when the drive is from the wheel to the shaft the lug will compress the yielding means to make a positive drive from the lug to the power arm and at the end of such stroke the yielding means will restore the contact between the lug and the adjustable rigid means.

4. In a device for taking up the slack in the chain drive of a wire loom of the type employing twin shafts each alternately rotated by the main driving mechanism: the combination with a shaft, of a sheave loosely mounted on said shaft, a drive chain secured to said sheave, a two-arm spider secured to said shaft, a set screw in one of said arms, a two-piece drive pin one portion of which is loosely mounted within the other arm of the spider, a spring for holding the two parts of the drive pin separated, and a lug fixedly secured to the sheave in engagement with the spring pressed end of the drive pin and with the set screw, whereby when the drive chain is pulled the lug will compress the spring to cause contact between the two parts of the drive pin and upon the end of the power stroke the spring will return the lug into contact with the set screw to take up the slack in the drive chain.

In testimony whereof I affix my signature.

JAMES B. KINTZING.